(No Model.)

J. H. MOORE.
ANIMAL POKE.

No. 586,743.

Patented July 20, 1897.

WITNESSES:
Harry S. Rohrer.
Edwin G. Yeabower.

INVENTOR
John H. Moore
BY
J. F. Beale
ATTORNEY.

UNITED STATES PATENT OFFICE.

JOHN H. MOORE, OF HYE, TEXAS.

ANIMAL-POKE.

SPECIFICATION forming part of Letters Patent No. 586,743, dated July 20, 1897.

Application filed March 29, 1897. Serial No. 629,789. (No model.)

*To all whom it may concern:*

Be it known that I, JOHN H. MOORE, a citizen of the United States, residing at Hye, in the county of Blanco and State of Texas, have invented certain new and useful Improvements in a Combined Animal-Poke and Safety Appliance for Horned Cattle; and I do hereby declare the following to be a full, clear, and exact description of the invention, such as will enable others skilled in the art to which it appertains to make and use the same.

My invention relates to animal-pokes and safety-guards for cattle.

The object of my invention is to provide a light and effective head-frame for horned cattle, designed to prevent their going through or injuring wire fences or from goring persons or animals.

Figure 1:
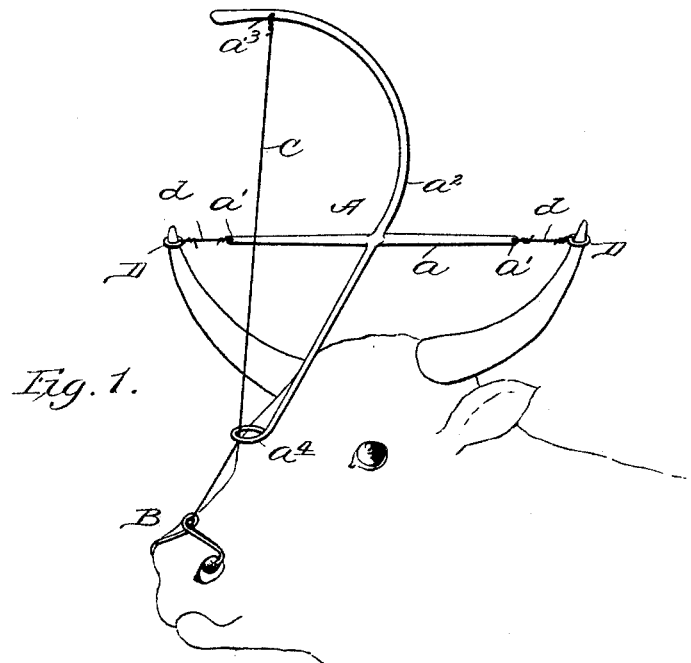
Figure 2:
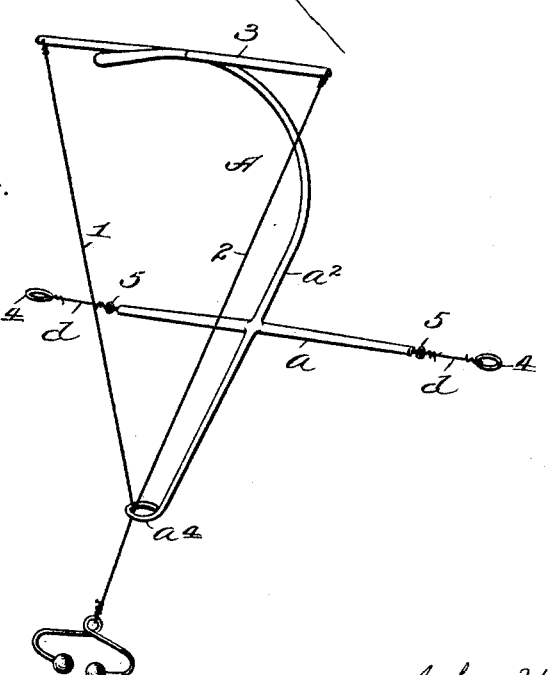

In the accompanying drawings, forming part of this specification, Figure 1 is a perspective view showing my invention attached. Fig. 2 shows a modification of my invention.

Referring more particularly to the drawings, A denotes a head-frame formed of one or more pieces composed of a horizontal piece $a$, having an eye $a'$ at each end, and an upright piece or arm $a^2$, rigidly secured to and arranged at right angles therewith and crossing the same midway of its length. The upper end of the arm $a^2$ is bent or bowed forwardly, and near its upper end or about four inches therefrom is a small perforation $a^3$. The lower end of said arm is provided with a ring $a^4$.

B denotes a nose-ring having an eye or loop formed in its crown, its meeting ends approaching each other in a horizontal plane, each having a round knob.

C denotes an adjustable wire fastened at one end to the eye in the nose-ring, thence passed through the eye $a^4$ and fastened through the perforation $a^3$ to the arm $a^2$.

D D denote two rings connected to the eyes $a'$ by adjustable wires $d\ d$. The head-frame is attached as shown in Fig. 1, the horizontal piece being first secured to the animal's horns by placing the rings on as near as possible to the ends of the horns and drawing the wires $d$ tight, passing them through the eyes $a'$ and through the rings, and fastening the same. The nose-ring is then adjusted and the wire C passed through its eye and drawn taut until the nose-ring is pressed into the upper part of the nostril. My object in thus adjusting and holding the nose-ring in the upper part of the nostril is to prevent friction of the nose-ring with the lower part of the nose, especially when the animal is grazing, often producing sore nose. Moreover, this arrangement allows the animal to clean its nostrils without bringing its tongue in contact with the ring, which would cause constant friction of the nose-ring against the cartilage. It will be seen that the horizontal piece is held firmly between the horns away from the face of the animal and free to turn on its wired ends as an axis.

As the animal attempts to go through a fence the upper end of the curved arm will catch on the fence-wire and cause the horizontal bar to turn, thus forcing the lower end of the arm $a$ to press upon the taut wire, causing the nose-ring to pull upon the nostrils. Again, any attempt of the animal to use either horn on the fence or to gore will bring the wire D in contact with the fence-wire or object of attack and pull directly upon the nose-ring.

In the modification shown in Fig. 2, instead of using a single wire connecting the nose-ring and arm $a$, I use two wires 1 and 2, connected at one end to the nose-ring and extending thence through the eye at the foot of the arm $a$ to the ends of a cross-bar 3. Again, the eyes 5, arranged at each end of the horizontal piece, are connected to the same by swiveled joints, so that the head-frame will turn freely upon said swivels as an axis.

It is evident that my head-gear, being adjustable lengthwise as well as laterally, is adapted for either half-grown or full-grown cattle.

Having shown and described my invention, what I claim, and desire to secure by Letters Patent, is—

In an animal-poke and safety device for horned cattle, the combination of the short horizontal arm adapted to be pivotally connected to the horns, the upright forwardly-curved arm rigidly secured to said horizontal arm, the wire or wires secured near the upper end of said curved arm and engaging the lower end of said curved arm and passing thence to a nose-ring to which it is detachably connected, said wire being in front of the horns to prevent goring.

In testimony whereof I affix my signature in presence of two witnesses.

JOHN H. MOORE.

Witnesses:
    ED. N. WALLACE,
    J. E. F. DILDINE.